United States Patent
Sorkin et al.

(10) Patent No.: US 11,462,982 B2
(45) Date of Patent: Oct. 4, 2022

(54) HYBRID PERMANENT MAGNET AND WOUND ROTOR STARTER GENERATOR

(71) Applicant: Safran Power USA, LLC, Twinsburg, OH (US)

(72) Inventors: Lev Sorkin, Cranford, NJ (US); Matthew Thomas Burger, Toms River, NJ (US)

(73) Assignee: Safran Power USA, LLC, Twinsburg, OH (US)

( * ) Notice: Subject to any disclaimer, the term of this patent is extended or adjusted under 35 U.S.C. 154(b) by 492 days.

(21) Appl. No.: 16/493,278

(22) PCT Filed: Sep. 19, 2018

(86) PCT No.: PCT/US2018/051727
§ 371 (c)(1),
(2) Date: Sep. 11, 2019

(87) PCT Pub. No.: WO2020/060545
PCT Pub. Date: Mar. 26, 2020

(65) Prior Publication Data
US 2021/0408882 A1 Dec. 30, 2021

(51) Int. Cl.
*H02P 1/46* (2006.01)
*H02K 21/04* (2006.01)
*H02K 1/276* (2022.01)
*H02K 21/14* (2006.01)

(52) U.S. Cl.
CPC ......... *H02K 21/042* (2013.01); *H02K 1/2766* (2013.01); *H02K 21/14* (2013.01)

(58) Field of Classification Search
CPC .... H02K 21/042; H02K 1/2766; H02K 21/14; H02P 9/006; H02P 9/305; H02P 2201/09; H02P 9/10
See application file for complete search history.

(56) References Cited

U.S. PATENT DOCUMENTS

| 5,631,544 A | 5/1997 | Syverson et al. |
| 2018/0254688 A1* | 9/2018 | Gieras .................. H02K 21/042 |

FOREIGN PATENT DOCUMENTS

| EP | 2814146 A2 | 12/2014 | |
| EP | 3767820 A1 * | 1/2021 | ............. H02P 23/14 |

OTHER PUBLICATIONS

International Patent Application No. PCT/US2018/051727, Search Report and Written Opinion, dated Dec. 11, 2018.

* cited by examiner

Primary Examiner — Karen Masih
(74) Attorney, Agent, or Firm — Kilpatrick Townsend & Stockton LLP

(57) ABSTRACT

Described is a hybrid permanent magnet and wire wound starter generator system. The system includes a polyphase stator that converts a rotating magnetic field to electrical energy. The system also includes a rotor including a plurality of permanent magnets and a wound rotor section. The plurality of permanent magnets and the wound rotor section each generate a portion of the rotating magnetic field. Further, the system includes a controller that controls a polarity of the wound rotor section by transitioning the wound rotor section between a magnetic flux enhancement mode and a magnetic flux weakening mode.

19 Claims, 4 Drawing Sheets

HYBRID PERMANENT MAGNET AND WOUND ROTOR STARTER GENERATOR

TECHNICAL FIELD

The field of the present disclosure relates to starter generators. More specifically, the present disclosure relates to a hybrid starter generator that includes a rotating magnetic field generated by both a permanent magnet section and a wound rotor section.

BACKGROUND

For electrical power generation, especially electrical power generation on an aircraft, the primary types of generators used are wound rotor machines (WRMs) and permanent magnet machines (PMMs). WRMs and PMMs each have disadvantages associated with power generation. In particular, the WRM is unable to induce voltage at a generator stator without voltage applied to rotor field windings of the WRM. Accordingly, even with a rotor of the WRM in motion, the WRM is unable to generate a magnetic flux to induce voltage at the generator stator absent application of voltage to the rotor field windings.

Further, the PMM induces voltage at a generator stator of the PMM at a level proportional to a speed of a rotor of the PMM. Because a magnetic flux of the PMM is not directly controllable, the PMM continues to induce voltage at the generator stator as long as the rotor of the PMM continues to rotate. Such a condition may lead to an overvoltage fault capable of cascading to other electrical systems. The PMM may also be unable to stop rotating during an overvoltage fault absent a mechanical clutch or braking component.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a hybrid permanent magnet and wire wound starter generator system may include a polyphase stator that converts a rotating magnetic field to electrical power. The system may also include a rotor with a plurality of permanent magnets and a wound rotor section. The plurality of permanent magnets and the wound rotor section may each generate a portion of the rotating magnetic field. Further, the system may include a controller that controls a polarity of the wound rotor section by transitioning the wound rotor section between a magnetic flux enhancement mode and a magnetic flux weakening mode.

According to certain embodiments of the present disclosure, a method of controlling a hybrid permanent magnet and wire wound starter generator system may include generating a rotating magnetic field based on a combination of a first magnetic field of a plurality of permanent magnets positioned around a rotor and a second magnetic field of a wound rotor section positioned around the rotor. The method may also include converting mechanical rotational energy of the rotor into electrical energy at a polyphase stator through the rotating magnetic field. Further, the method may include controlling a direction of the second magnetic field to a flux weakening direction or a flux enhancement direction based on the voltage produced by the polyphase stator.

According to certain embodiments of the present disclosure, a system may include a polyphase stator that converts a rotating magnetic field to electrical energy. The system may also include a rotor. In certain embodiments, the rotor includes a plurality of permanent magnets that generates a first portion of the rotating magnetic field and a wound rotor section that generates a second portion of the rotating magnetic field. The wound rotor section may include a rotating bidirectional bridge rectifier, a main field winding electrically coupled to the rotating bidirectional bridge rectifier, and an exciter electrically coupled to the rotating bidirectional bridge rectifier. In certain embodiments, the exciter energizes the main field winding. Further, the system may include a controller that controls a polarity of the wound rotor section by transitioning the rotating bidirectional bridge rectifier between a magnetic flux enhancement mode and a magnetic flux weakening mode.

DETAILED DESCRIPTION

Figure 1:
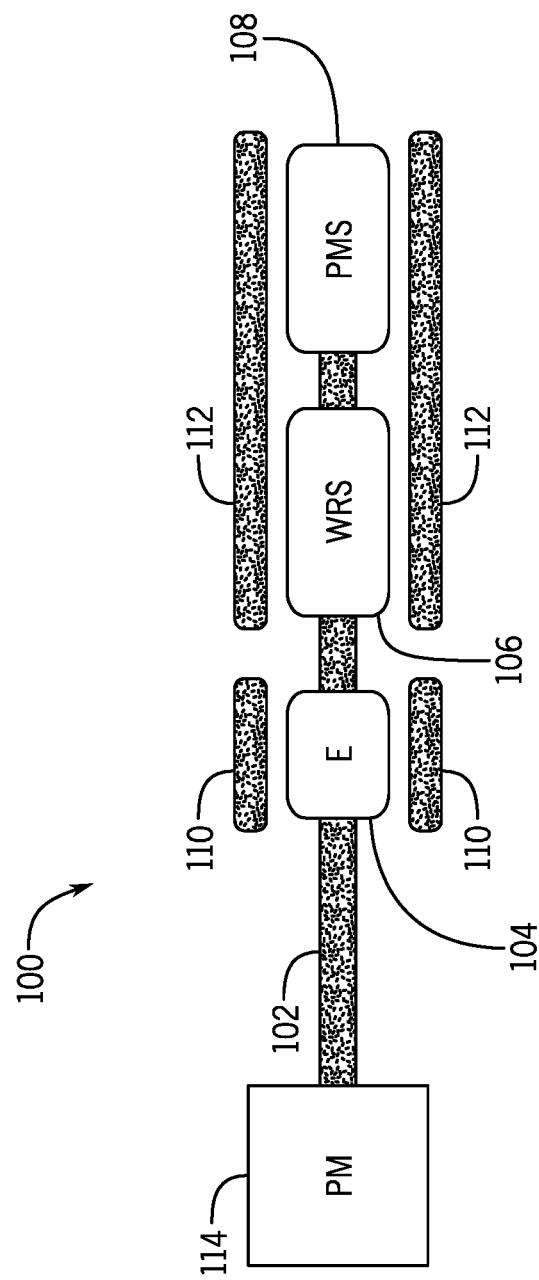
FIG. 1 is a block diagram of a hybrid permanent magnet and wound rotor starter generator, according to certain embodiments of the present disclosure.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to a hybrid permanent magnet and wire wound starter generator ("hybrid generator") and operation of the hybrid generator. The hybrid generator may be used to generate electrical power used in aircraft electrical systems, but the hybrid generator is not limited to operation in such an environment.

For example, the hybrid generator may be used may be used in any power generation environment. The hybrid generator includes a permanent magnet section and a wound rotor section to generate a combined rotating magnetic field used to generate electric power at a polyphase stator of the hybrid generator.

While the magnetic field generated by the permanent magnet section of the hybrid generator is largely static, the voltage induced at the polyphase stator of the hybrid generator may increase as a rotating speed of the permanent magnet section increases. To provide control to the voltage induced at the polyphase stator, the polarity of the rotating magnetic field generated by the wound rotor section may be controllable. For example, a controller may control the polarity and magnitude of the rotating magnetic field to enhance the magnetic flux of the permanent magnet section or to weaken the magnetic flux of the permanent magnet section depending on a target voltage induced at the polyphase stator and a voltage induced by the magnetic field of the permanent magnet section at the polyphase stator.

By combining the permanent magnet section with the wound rotor section, the hybrid generator reduces shortcomings of the two sections that occur when operated individually. In an embodiment, the wound rotor section is able to weaken the magnetic flux of the permanent magnet section by switching the magnetic field of the wound rotor section to a polarity opposite a polarity of the magnetic field of the permanent magnet section. Accordingly, the hybrid generator is able to avoid overvoltage faults and provide a method to de-energize the permanent magnet section without the use of a mechanical brake or clutch. Further, the permanent magnet section enables generation of voltage at the polyphase stator even when the field winding of the wound rotor section is not energized.

The described embodiments provide a hybrid permanent magnet and wire wound starter generator. While the hybrid permanent magnet and wire wound starter generator is discussed for use in an aircraft, it is by no means so limited. Rather, embodiments of the hybrid permanent magnet and wire wound starter generator may be used in power generation systems or starter generator systems of any type or otherwise as desired.

FIG. 1 is a block diagram of a hybrid permanent magnet and wire wound starter generator 100 (the "hybrid generator 100"). The hybrid generator 100 includes a rotor shaft 102 with an exciter 104, a wound rotor section 106, and a permanent magnet section 108 positioned along the rotor shaft 102. The exciter 104 is positioned within an exciter stator 110. The exciter stator 110 may include one or more coils coupled to an excitation power source. As current flows across the coils within the exciter stator 110, the coils generate a magnetic field at the exciter stator 110. The magnetic field at the exciter stator 110 excites exciter coils located along the exciter 104. Excitation of the exciter coils of the exciter 104 generates power to energize field windings of the wound rotor section 106. With energized field windings, the wound rotor section 106 is able to generate a rotating magnetic field that induces a current output at a polyphase stator 112.

A prime mover 114 rotates the rotor shaft 102. The prime mover 114 may be any source of mechanical energy capable of rotating the rotor shaft 102. For example, the prime mover 114 may be a vehicle engine, such as in an aircraft or automobile, or the prime mover 114 may be a wind or water turbine. The rotation of the rotor shaft 102 by the prime mover 114 results in the exciter 104 rotating within the exciter stator 110. Rotation of the exciter 104 may result in the exciter stator 110 inducing voltage at the exciter 104 to energize the wound rotor section 106. The rotation of the rotor shaft 102 may also enable the energized wound rotor section 106 to generate the rotating magnetic field that induces voltage at the output of the polyphase stator 112. The combination of the induced voltage and the current associated with the induced voltage produced at the output of the polyphase stator 112 may be used to power electrical systems that are electrically coupled to the hybrid generator 100. For example, the electrical systems powered by the hybrid generator 100 may include aircraft electronics systems such as power to a cockpit of the aircraft, flight controls, environmental controls, anti-icing, deicing, etc.

The permanent magnet section 108 is also positioned along the rotor shaft 102. The permanent magnet section 108 may include a plurality of permanent magnets positioned around the rotor shaft 102. The permanent magnets may be arranged around the rotor shaft 102 with alternating polarities, and the rotating magnetic field generated by the permanent magnets rotating with the rotor shaft 102 induces voltage at the polyphase stator 112. In an example, the permanent magnets of the permanent magnet section 108 include rare-earth magnets. Other types of permanent magnets are also contemplated for use within the permanent magnet section 108. When current is supplied to the wound rotor section 106, a total rotating magnetic field acting on the polyphase stator 112 may include the rotating magnetic field generated by the wound rotor section 106 and the rotating magnetic field generated by the permanent magnet section 108.

The two rotating magnetic fields generated by the wound rotor section 106 and the permanent magnet section 108 are added together geometrically to generate the total rotating magnetic field. That is, because the rotating magnetic fields individually have a magnitude and a direction (i.e., a vector), the combination of the individual rotating magnetic fields is the combination of the magnitudes and the directions of the individual rotating magnetic fields. Accordingly, the wound rotor section 106 may generate a rotating magnetic field that enhances the rotating magnetic field of the permanent magnet section 108 when the exciter 104 provides current to the wound rotor section 106 in one direction (e.g., a positive or a negative current), and the wound rotor section 106 may generate a rotating magnetic field that weakens the rotating magnetic field of the permanent magnet section 108 when the exciter 104 provides current to the wound rotor section 106 in the opposite direction.

In some embodiments, the hybrid generator 100 may also operate as a starter. The starter functionality may occur when a battery or other energy storage device, through a converter module, applies a voltage to a stator winding of the polyphase stator 112. The magnetic fields generated by permanent magnets of the permanent magnet section 108 and the magnetic field of the wound rotor section 106 interact with the magnetic field generated by the application of current to the stator winding of the polyphase stator 112. The result of this magnetic field interaction may be rotation of the rotor shaft 102 that provides starting power to the prime mover 114. An energized wound rotor section 106 may also contribute to the rotation of the rotor shaft 102 that provides the starting power to the prime mover 114.

Figure 2:
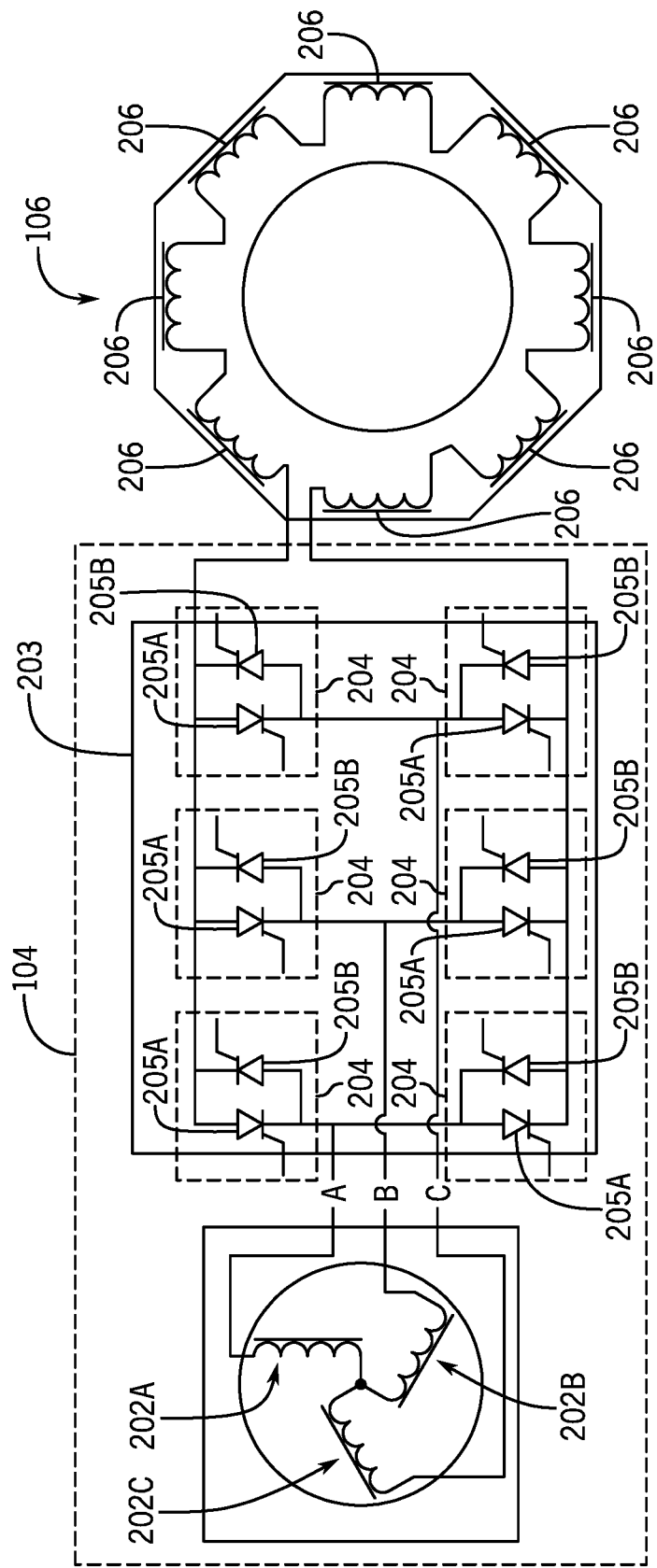
FIG. 2 is a schematic diagram of an exciter and a wound rotor section of the hybrid permanent magnet and wound rotor starter generator of FIG. 1, according to certain embodiments of the present disclosure.

FIG. 2 is a schematic diagram of the exciter 104 and the wound rotor section 106 of the hybrid generator 100. Voltage is applied across an exciter field winding contained within the exciter stator 110 to induce voltage across exciter rotor windings 202a, 202b, and 202c of the exciter 104. When a magnetic field is provided by the exciter stator 110, the exciter rotor windings 202a, 202b, and 202c generate a three-phase power output. While the three-phase power output is depicted as the output from the exciter rotor windings 202a, 202b, and 202c, more or fewer phases are also contemplated as power outputs from the exciter rotor windings 202. Accordingly, the exciter rotor windings 202 may be implemented in any polyphase arrangement about the rotor shaft 102.

The rotating bidirectional bridge rectifier 203 includes two bidirectional switches 204 at each output of the exciter rotor windings 202a, 202b, and 202c. The bidirectional switches 204 rectify the power outputs of the exciter rotor windings 202a, 202b, and 202c to a DC output with a specified voltage polarity. Each of the bidirectional switches 204 include a pair of controllable or partially controllable solid state switches 205a and 205b (e.g., silicon controlled rectifiers) oriented in an anti-parallel arrangement. For example, the solid state switches 205a may all be controlled to an "on" state while the solid state switches 205b are all controlled to, or are allowed to switch to, an "off" state. In such an example, the rotating bidirectional bridge rectifier 203 generates a rectified output that includes a DC signal in a first direction (e.g., either a positive or a negative direction) to main field windings 206 of the wound rotor section 106. In another embodiment, the solid state switches 205a may all be controlled to, or be allowed to switch to, an "off" state while the solid state switches 205b are all controlled to an "on" state. In such an example, the rotating bidirectional bridge rectifier 203 outputs the current in a second direction to the wound rotor section 106, where the second direction is opposite the first direction. Accordingly, the rotating bidirectional bridge rectifier 203 is able to control a direction of the output current provided to the wound rotor section 106 based on activation and deactivation of the solid state switches 205a and 205b.

Changing the direction of the current output by the exciter 104 to the wound rotor section 106 changes the direction of the magnetic field generated by main field windings 206 of the wound rotor section 106. Due to the orientation of the main field windings 206, a change in the direction of the magnetic field may enhance a rotating magnetic field that includes a combined magnetic field generated by the permanent magnet section 108, or the direction of the magnetic field may weaken the combined magnetic field that includes the magnetic field generated by the permanent magnet section 108. For example, by controlling the solid state switches 205a to an "on" position and the solid state switches 205b to an "off" position, the magnetic field of the main field windings 206 may be in a magnetic field enhancement mode in relation to the magnetic field of the permanent magnet section 108. Additionally, by controlling the solid state switches 205a to an "off" position and the solid state switches 205b to an "on" position, the magnetic field of the main field windings 206 may be in a magnetic field weakening mode in relation to the magnetic field of the permanent magnet section 108. In either scenario, magnetic flux density field vectors of the magnetic fields of both the wound rotor section 106 and the permanent magnet section 108 are added geometrically to determine the combined rotating magnetic field interacting with the polyphase stator 112. That is, both the magnitude and the direction of the magnetic fields are taken into account when determining the combined rotating magnetic field of the wound rotor section 106 and the permanent magnet section 108.

Figure 3:
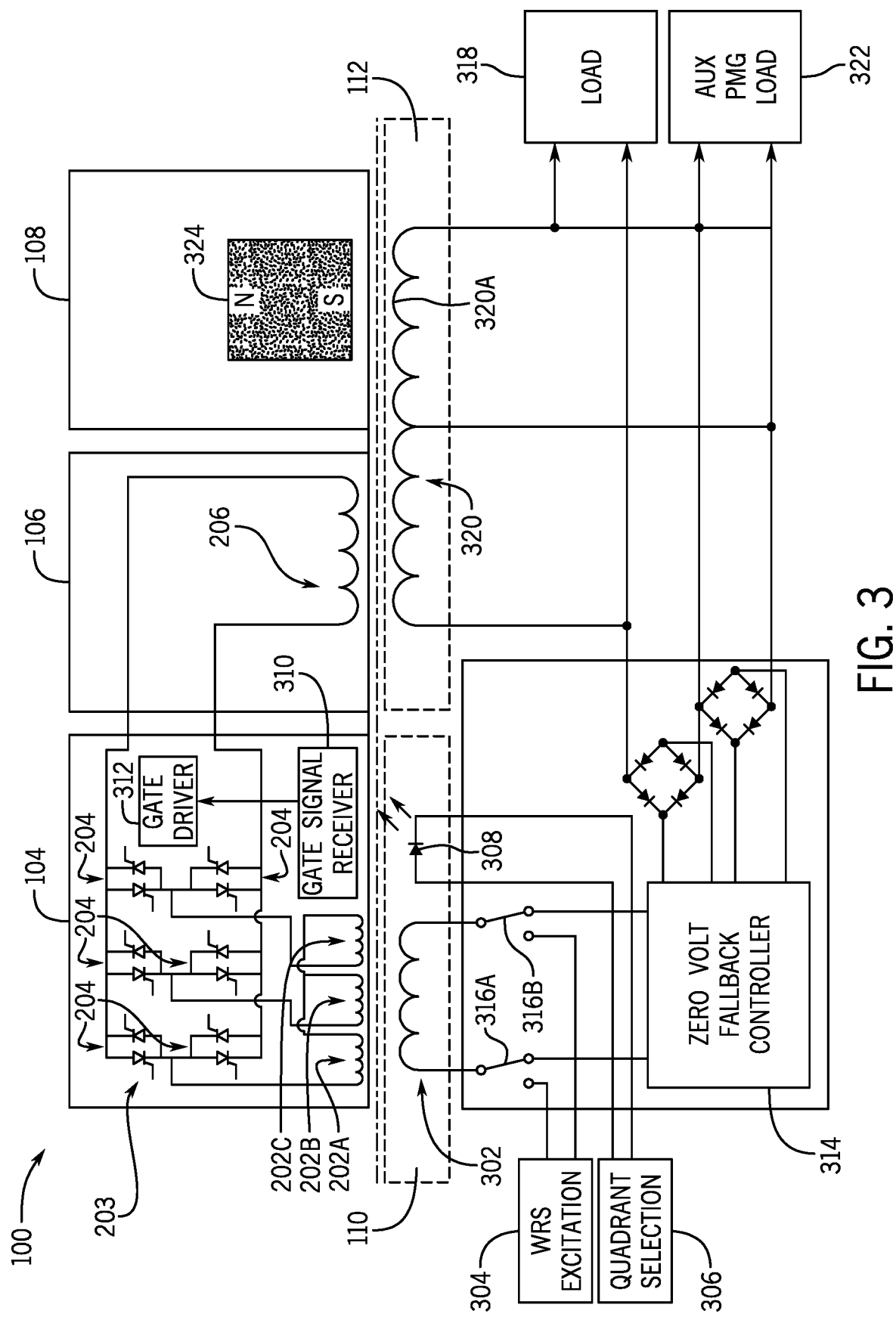
FIG. 3 is a schematic diagram of the hybrid permanent magnet and wound rotor starter generator of FIG. 1, according to certain embodiments of the present disclosure.

FIG. 3 is a schematic diagram of the hybrid generator 100. The magnetic field generated by the wound rotor section 106 may be dependent on the direction of the current supplied to the main field windings 206, as determined by the operation of the bidirectional switches 204, and a magnitude of the current supplied to the main field windings 206, as determined by a current flowing to an exciter stator winding 302. For example, as the current flowing to the exciter stator winding 302 increases, a magnitude of the magnetic field generated by the wound rotor section 106 may also increase. Further, when the exciter 104 is in a flux weakening mode, the combined magnitude of the magnetic field generated by the wound rotor section 106 and the permanent magnet section 108 may decrease as the current flowing to the exciter stator winding 302 increases.

In an example, a wound rotor section excitation controller 304 controls an exciter current provided to the exciter stator winding 302. Controlling the magnitude of the exciter current provided to the exciter stator winding 302 may also control the magnitude of the magnetic field generated by the main field windings 206. Accordingly, the wound rotor section excitation controller 304 may increase the magnitude of the exciter current provided to the exciter stator winding 302 to increase the magnitude of the magnetic field generated by the main field windings 206, or the wound rotor section excitation controller 304 may decrease the magnitude of the exciter current provided to the exciter stator winding 302 to decrease the magnitude of the magnetic field generated by the main field windings 206.

A quadrant selection controller 306 is also depicted in FIG. 3. The quadrant selection controller 306 controls light output by a light-emitting diode (LED) 308. When controlling the direction of the magnetic field generated by the wound rotor section 106 to an opposite direction, the quadrant selection controller 306 may produce a light output signal at the LED 308. The light output signal provides an indication of the change of direction to a gate signal receiver 310 of the exciter 104. In such an embodiment, the gate signal receiver 310 may be an optocoupler that converts the light output signal to an electrical signal provided to a gate driver 312. The gate driver 312 may use the electrical signal to drive the gates of the bidirectional switches 204 to an opposite orientation by providing gate drive signals to the bidirectional switches 204. As discussed above with reference to FIG. 2, the opposite orientation of the bidirectional switches 204 changes a direction of the current provided to the main field windings 206 of the wound rotor section 106. This change in direction of the current provided to the main field windings 206 may enable the wound rotor section 106 to change from a magnetic flux enhancement mode to a magnetic flux weakening mode or vice versa.

While FIG. 3 depicts the LED 308 providing the indication of the change of direction to the gate signal receiver 310, other signaling devices are also contemplated. For example, the LED 308 may be replaced by a magnetic field generator, and the gate signal receiver 310 may detect magnetic fields generated by the magnetic field generator indicating the change of direction.

The magnetic field of the wound rotor section may also be controlled using a zero volt fallback controller 314. In an example, switches 316a and 316b may switch from providing current to the exciter stator winding 302 from the wound rotor section excitation controller 304 to providing current to the exciter stator winding 302 from the zero volt fallback controller 314. The zero volt fallback controller 314 may receive feedback from an output of the polyphase stator 112. The feedback from the output of the polyphase stator 112 may include a voltage induced by the total magnetic field of the wound rotor section 106 and the permanent magnet section 108, and the feedback may also include a voltage induced by only the permanent magnet section 108. When a fault condition is detected, the switches 316a and 316b may switch to electrically couple the zero volt fallback controller 314 to the exciter stator winding 302 of the exciter stator 110. The zero volt fallback controller 314 uses the feedback received from the output of the polyphase stator 112 to control the magnetic field generated by the wound rotor section 106 to counter the magnetic field generated by the permanent magnet section 108. In countering the magnetic field generated by the permanent magnet section 108, the voltage induced at the polyphase stator 112 may be reduced to zero, which stops provision of power to a load 318 of the hybrid generator 100.

In an example, a polyphase stator winding 320 provides power to the load 318, and a portion 320a of the polyphase stator winding 320 provides power to an auxiliary permanent magnet generator load 322. The polyphase stator winding 320 as a whole may output zero volts when the zero volt fallback controller 314 is operational. However, the permanent magnet section 108 may still induce an auxiliary current at the portion 320a of the polyphase stator winding 320 to power the auxiliary permanent magnet generator load 322. In an embodiment, the auxiliary permanent magnet generator load 322 may be a generator control unit (GCU) or a starter generator control unit (SGCU). 28V power may be supplied to the GCU or the SGCU at the auxiliary permanent magnet generator load 322 such that the GCU and the SGCU are powered independently from the aircraft battery system once the rotation of the permanent magnet section 108 is established.

As discussed above with respect to FIG. 1, the permanent magnet section 108 may include a plurality of permanent magnets 324 arranged around the rotor shaft 102. The permanent magnets 324 may be arranged around the rotor shaft 102 such that polarities of the permanent magnets 324 alternate. As the permanent magnet section 108 rotates, a pair of neighboring permanent magnets 324 with alternating polarities generate a complete cycle of magnetic field oscillation experienced at the polyphase stator winding 320 of the polyphase stator 112. In an example, the permanent magnet section 108 includes four of the permanent magnets 324 (e.g., arranged in an alternating north south pattern), and each revolution of the rotor shaft 102 produces two complete cycles of magnetic field oscillation experienced at the polyphase stator winding 320. Further, if the polyphase stator 112 includes three separate stator windings 320 (e.g., for a three-phase power output), each of the three stator windings 320 experience two complete cycles of magnetic field oscillation when four of the permanent magnets 324 are positioned around the rotor shaft 102. Other numbers of permanent magnets 324 and stator windings 320 are also contemplated.

Figure 4:
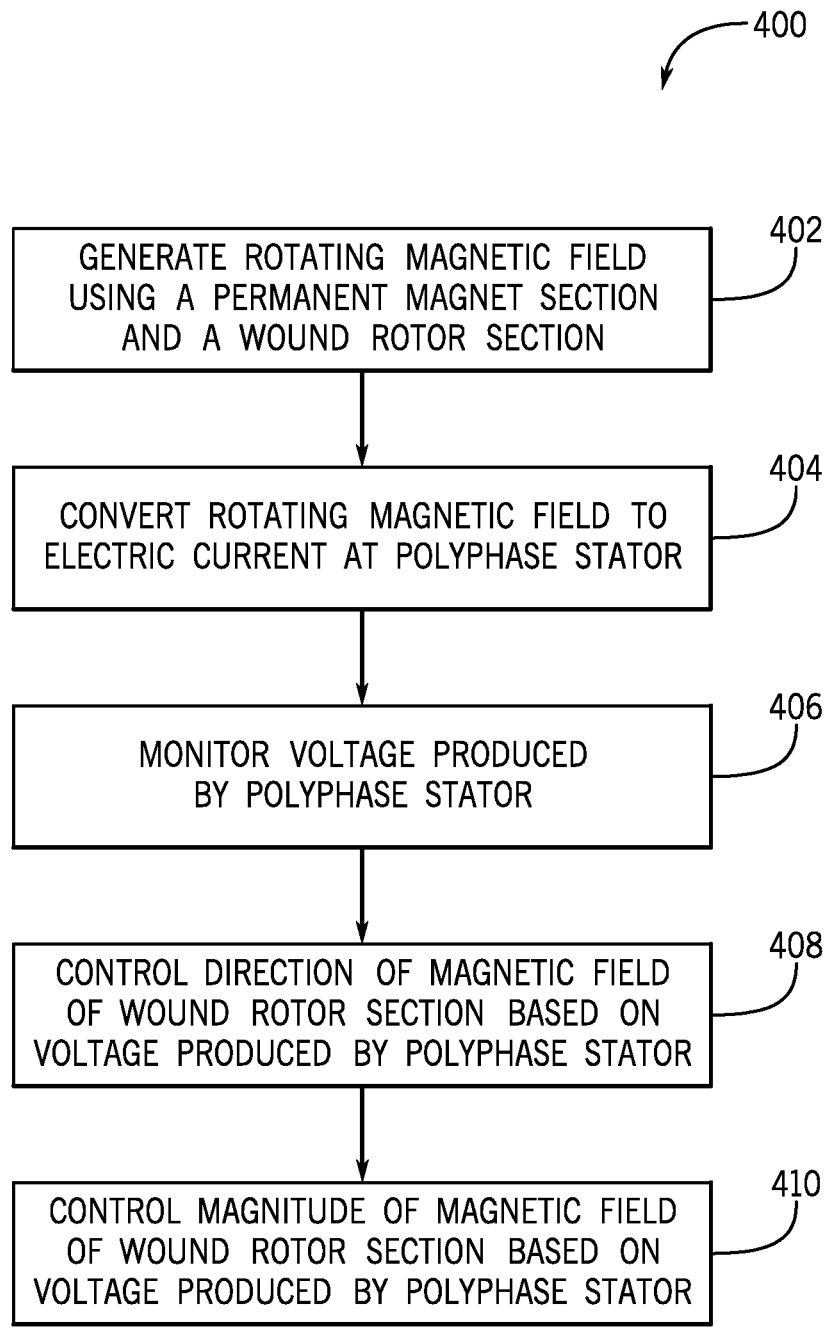
FIG. 4 is a flow chart of a process for controlling an output of the hybrid permanent magnet and wound rotor starter generator of FIG. 1, according to certain embodiments of the present disclosure.

FIG. 4 is a flow chart of a process 400 for controlling an output of the hybrid generator 100. As discussed above, the output of the hybrid generator 100 may be controllable by controlling the magnetic field generated by the wound rotor section 106. For example, the wound rotor section 106 may be controlled to an enhancement mode that generates a magnetic field to enhance the magnetic field of the permanent magnet section 108, or the wound rotor section 106 may be controlled to a weakening mode that generates a magnetic field that weakens or counters the magnetic field of the permanent magnet section 108.

At block 402, the process 400 involves generating a rotating magnetic field using the permanent magnet section 108 and the wound rotor section 106. The permanent magnet section 108 may generate a portion of the rotating magnetic field, and the wound rotor section 106 may also generate a portion of the rotating magnetic field. The two portions of the rotating magnetic field generated by the permanent magnet section 108 and the wound rotor section 106 add together geometrically to form the rotating magnetic field of the hybrid generator 100 that interacts with the polyphase stator 112.

At block 404, the process 400 involves converting mechanical rotational energy of the hybrid generator 100 to electrical energy through the rotating magnetic field. That is, the rotating magnetic field induces voltage on the stator windings 320 of the polyphase stator 112 to generate power output by the hybrid generator 100 to the load 318. The voltage induced at the polyphase stator 112 may increase or decrease by controlling the magnetic field generated by the wound rotor section 106.

At block 406, the process 400 involves monitoring voltage produced by the polyphase stator 112. During operation of the hybrid generator 100, maintaining the voltage produced by the polyphase stator 112 may be desirable. Because the voltage output by the permanent magnet section 108 is proportional to the rotational speed of the rotor shaft 102, the wound rotor section 106 may be controlled to enhance or weaken the rotating magnetic field to regulate the voltage output of the hybrid generator 100 to a desired magnitude. Accordingly, the voltage output by the hybrid generator 100 is monitored and supplied to the wound rotor section excitation controller 304 and the zero volt fallback controller 314.

At block 408, the process 400 involves controlling a direction of the magnetic field of the wound rotor section 106 based on the voltage produced by the polyphase stator 112. For example, if the voltage produced by the polyphase stator 112 is less than a target output voltage, the wound rotor section 106 may be controlled to a magnetic field enhancement mode. That is, the magnetic field of the wound rotor section 106 may be generated in a same direction as the magnetic field of the permanent magnet section 108. If the voltage produced by the polyphase stator 112 is greater than the target output voltage, the wound rotor section 106 may be controlled to a magnetic field weakening mode. That is, the magnetic field of the wound rotor section 106 may be generated in a direction opposite the direction of the magnetic field of the permanent magnet section 108.

To control the direction of the magnetic field of the wound rotor section 106, the quadrant selection controller 306 may control the LED 308 to transmit a signal indicating a direction change of the rotating bidirectional bridge rectifier 203. The gate signal receiver 310 receives the signal from the LED 308 and controls the gate driver 312 to change the orientation of the solid state switches 205a and 205b. For example, the gate driver 312 may provide a voltage signal to the gates of the solid state switches 205a while removing a voltage signal to the gates of the solid state switches 205b. Likewise, the gate driver 312 may remove a voltage signal to the gates of the solid state switches 205a while providing a voltage signal to the gates of the solid state switches 205b. Transitioning one set of the solid state switches 205a or 205b from an "on" state to an "off" state and the other set of the solid state switches 205a or 205b from an "off" state to an "on" state may result in changing the direction of the magnetic field of the wound rotor section 106.

In addition to controlling the direction of the magnetic field, at block 410, the process 400 involves controlling a magnitude of the magnetic field of the wound rotor section 106 based on the voltage produced at the polyphase stator 112. By way of example, the wound rotor section excitation controller may increase or decrease a current applied to the exciter stator winding 302 of the exciter stator 110. The magnitude of current applied to the exciter stator winding 302 may control the magnitude of the magnetic field of the wound rotor section 106. Accordingly, by increasing the magnitude of the current applied to the exciter stator winding 302, the magnitude of the magnetic field of the wound rotor section 106 may also increase. Likewise, by decreasing the magnitude of the current applied to the exciter stator winding 302, the magnitude of the magnetic field of the wound rotor section 106 may also decrease.

In one or more embodiments, the magnitude of the magnetic field may also be controlled based on operation of the solid state switches 205a and 205b. For example, the solid state switches 205a or 205b that are in a forward conduction mode may phase control the rectified signal provided to the main field windings 206 of the wound rotor section 106. Phase controlling the rectified signal may involve maintaining both of the solid state switches 205a and 205b in a forward blocking state until later into a half-cycle of the AC input from the exciter rotor windings 202a, 202b, and 202c rather than turning one of the rectifiers 205a or 205b to a forward conducting state at a beginning of the half-cycle. The result is a form of pulse width modulating the output of the bidirectional bridge rectifier 203. Accordingly, the solid state switches 205a and 205b may only pass a portion of the positive or negative cycle of the AC signal based on when the solid state switches 205a and 205b are controlled to the forward conduction mode.

In controlling both the direction and magnitude of the magnetic field of the wound rotor section 106 at blocks 408 and 410, the wound rotor section excitation controller 304 is able to control the voltage output of the hybrid generator 100 to the target voltage regardless of the rotational speed of the rotor shaft 102. Moreover, the zero volt fallback controller 314 may be implemented to control the direction and magnitude of the magnetic field of the wound rotor section 106 to control the voltage output of the hybrid generator 100 to zero. For example, should the hybrid generator 100 or an associated electrical system experience a fault condition, it may be desirable for the hybrid generator 100 to stop generating power. To stop generating power, the wound rotor section 106 generates a magnetic field with a magnetic flux density field vector that cancels a magnetic flux density field vector of the magnetic field of the permanent magnet section 108. Because the two magnetic flux density field vectors cancel each other out, the hybrid generator 100 stops generating power without applying a mechanical brake or clutch to stop the rotor shaft 102 from spinning. Sensitive electronic components may be spared from negative effects of a fault condition when the hybrid generator 100 is automatically controlled to stop outputting power by the zero volt fallback controller 314.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a system, comprising: a polyphase stator configured to convert a rotating magnetic field to electrical power; a rotor, comprising: a plurality of permanent magnets; and a wound rotor section, wherein the plurality of permanent magnets and the wound rotor section are each configured to generate a portion of the rotating magnetic field; and a controller configured to control a polarity of the wound rotor section by transitioning the wound rotor section between a magnetic flux enhancement mode and a magnetic flux weakening mode.

Example 2 is the system of example 1, wherein the controller is configured to control a magnitude of the portion of the rotating magnetic field generated by the wound rotor section.

Example 3 is the system of examples 1-2, wherein the rotor comprises an exciter configured to excite the wound rotor section.

Example 4 is the system of example 3, further comprising: a rotating bidirectional bridge rectifier configured to rectify an output of the exciter and provide the rectified output to the wound rotor section, wherein the rotating bidirectional bridge rectifier is controllable between the magnetic flux enhancement mode and the magnetic flux weakening mode.

Example 5 is the system of example 4, wherein the rotating bidirectional bridge rectifier comprises: a plurality of bidirectional switches, wherein each bidirectional switch of the plurality of bidirectional switches comprise a first solid state switch oriented in a first direction and a second solid state switch oriented in a second direction opposite the first direction.

Example 6 is the system of example 5, wherein controlling the rotating bidirectional bridge rectifier between the magnetic flux enhancement mode and the magnetic flux weakening mode comprises changing a direction of current conduction within the plurality of bidirectional switches.

Example 7 is the system of example 5, wherein the rotating bidirectional bridge rectifier further comprises: a gate signal receiver configured to receive an indication to change between the magnetic flux enhancement mode and the magnetic flux weakening mode; and a gate driver configured to provide gate drive signals to control the plurality of bidirectional switches between the magnetic flux enhancement mode and the magnetic flux weakening mode based on the indication received by the gate signal receiver.

Example 8 is the system of examples 1-7, further comprising: a zero volt fallback controller configured to control the portion of the rotating magnetic field generated by the wound rotor section to a magnitude and a direction that cancels the portion of the rotating magnetic field generated by the plurality of permanent magnets.

Example 9 is the system of examples 1-8, wherein the portion of the rotating magnetic field generated by the plurality of permanent magnets is configured to induce an auxiliary voltage in the polyphase stator used to power an auxiliary permanent magnet generator load.

Example 10 is a method, comprising: generating a rotating magnetic field based on a combination of a first magnetic field of a plurality of permanent magnets positioned around a rotor and a second magnetic field of a wound rotor section positioned around the rotor; converting mechanical rotational energy of the rotor into electrical energy at a polyphase stator through the rotating magnetic field; monitoring a voltage produced by the polyphase stator; and controlling a direction of the second magnetic field to a flux weakening direction or a flux enhancement direction based on the voltage produced by the polyphase stator.

Example 11 is the method of example 10, further comprising: controlling a magnitude of the second magnetic field based on the voltage produced by the polyphase stator.

Example 12 is the method of example 11, further comprising: controlling the second magnetic field of the wound rotor section to the magnitude and the direction that cancels the first magnetic field generated by the plurality of permanent magnets.

Example 13 is the method of example 11, wherein controlling the magnitude of the second magnetic field comprises controlling an amount of current provided to an exciter stator associated with an exciter of the wound rotor section.

Example 14 is the method of examples 10-13, wherein controlling the direction of the second magnetic field comprises switching a plurality of bidirectional switches of a bidirectional bridge rectifier between the flux weakening direction and the flux enhancement direction.

Example 15 is the method of examples 10-14, further comprising: inducing an auxiliary voltage across the polyphase stator from the first magnetic field of the plurality of permanent magnets; and providing power resulting from the auxiliary voltage to an auxiliary permanent magnet generator load.

Example 16 is a system, comprising: a polyphase stator configured to convert a rotating magnetic field to electrical energy; a rotor, comprising: a plurality of permanent magnets configured to generate a first portion of the rotating magnetic field; and a wound rotor section configured to generate a second portion of the rotating magnetic field, wherein the wound rotor section comprises: a rotating bidirectional bridge rectifier; a main field winding electrically coupled to the rotating bidirectional bridge rectifier; and an exciter electrically coupled to the rotating bidirectional bridge rectifier, wherein the exciter is configured to energize the main field winding; and a controller configured to control a polarity of the wound rotor section by transitioning the rotating bidirectional bridge rectifier between a magnetic flux enhancement mode and a magnetic flux weakening mode.

Example 17 is the system of example 16, wherein the rotating bidirectional bridge rectifier comprises a plurality of bidirectional switches, wherein the plurality of bidirectional switches are controllable by the controller to transition between the magnetic flux enhancement mode and the magnetic flux weakening mode.

Example 18 is the system of examples 16-17, further comprising: an exciter stator configured to control an output of the exciter, wherein the controller is configured to control a magnitude of the second portion of the rotating magnetic field generated by the wound rotor section by increasing or decreasing an exciter current provided to the exciter stator.

Example 19 is the system of examples 16-18, further comprising: a zero volt fallback controller configured to control the second portion of the rotating magnetic field generated by the wound rotor section to a magnitude and direction that cancels the first portion of the rotating magnetic field generated by the plurality of permanent magnets.

Example 20 is the system of examples 16-19, wherein the exciter is configured to output a polyphase power source to the rotating bidirectional bridge rectifier, and the rotating bidirectional bridge rectifier is configured to rectify the polyphase power source to output a positive DC signal or a negative DC signal to the main field winding based on control of the rotating bidirectional bridge rectifier between the magnetic flux enhancement mode and the magnetic flux weakening mode.

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A system, comprising:
   a polyphase stator configured to convert a rotating magnetic field to electrical power;
   a rotor, comprising:
      a plurality of permanent magnets;
      a wound rotor section, wherein the plurality of permanent magnets and the wound rotor section are each configured to generate a portion of the rotating magnetic field, and
      an exciter configured to excite the wound rotor section; and
   a controller configured to control a polarity of the wound rotor section by transitioning the wound rotor section between a magnetic flux enhancement mode and a magnetic flux weakening mode.

2. The system of claim 1, wherein the controller is configured to control a magnitude of the portion of the rotating magnetic field generated by the wound rotor section.

3. The system of claim 1, further comprising an exciter stator, wherein when energized, coils of the exciter stator excite the exciter, which in turns excites the wound rotor section.

4. The system of claim 1, further comprising:
   a rotating bidirectional bridge rectifier configured to rectify an output of the exciter and provide the rectified output to the wound rotor section, wherein the rotating bidirectional bridge rectifier is controllable between the magnetic flux enhancement mode and the magnetic flux weakening mode.

5. The system of claim 4, wherein the rotating bidirectional bridge rectifier comprises:
   a plurality of bidirectional switches, wherein each bidirectional switch of the plurality of bidirectional switches comprise a first solid state switch oriented in a first direction and a second solid state switch oriented in a second direction opposite the first direction.

6. The system of claim 5, wherein controlling the rotating bidirectional bridge rectifier between the magnetic flux enhancement mode and the magnetic flux weakening mode comprises changing a direction of current conduction within the plurality of bidirectional switches.

7. The system of claim 5, wherein the rotating bidirectional bridge rectifier further comprises:
   a gate signal receiver configured to receive an indication to change between the magnetic flux enhancement mode and the magnetic flux weakening mode; and
   a gate driver configured to provide gate drive signals to control the plurality of bidirectional switches between the magnetic flux enhancement mode and the magnetic flux weakening mode based on the indication received by the gate signal receiver.

8. The system of claim 1, further comprising:
   a zero volt fallback controller configured to control the portion of the rotating magnetic field generated by the wound rotor section to a magnitude and a direction that cancels the portion of the rotating magnetic field generated by the plurality of permanent magnets.

9. The system of claim 1, wherein the portion of the rotating magnetic field generated by the plurality of permanent magnets is configured to induce an auxiliary voltage in the polyphase stator used to power an auxiliary permanent magnet generator load.

10. A method, comprising:
generating a rotating magnetic field based on a combination of a first magnetic field of a plurality of permanent magnets positioned around a rotor and a second magnetic field of a wound rotor section positioned around the rotor;
converting mechanical rotational energy of the rotor into electrical energy at a polyphase stator through the rotating magnetic field;
monitoring a voltage produced by the polyphase stator; and
controlling a direction of the second magnetic field to a flux weakening direction or a flux enhancement direction based on the voltage produced by the polyphase stator by controlling an amount of current provided to an exciter stator associated with an exciter of the wound rotor section.

11. The method of claim 10, further comprising:
controlling a magnitude of the second magnetic field based on the voltage produced by the polyphase stator.

12. The method of claim 11, further comprising:
controlling the second magnetic field of the wound rotor section to the magnitude and the direction that cancels the first magnetic field generated by the plurality of permanent magnets.

13. The method of claim 10, wherein controlling the direction of the second magnetic field comprises switching a plurality of bidirectional switches of a bidirectional bridge rectifier between the flux weakening direction and the flux enhancement direction.

14. The method of claim 10, further comprising:
inducing an auxiliary voltage across the polyphase stator from the first magnetic field of the plurality of permanent magnets; and
providing power resulting from the auxiliary voltage to an auxiliary permanent magnet generator load.

15. A system, comprising:
a polyphase stator configured to convert a rotating magnetic field to electrical energy;
a rotor, comprising:
a plurality of permanent magnets configured to generate a first portion of the rotating magnetic field; and
a wound rotor section configured to generate a second portion of the rotating magnetic field, wherein the wound rotor section comprises:
a rotating bidirectional bridge rectifier;
a main field winding electrically coupled to the rotating bidirectional bridge rectifier; and
an exciter electrically coupled to the rotating bidirectional bridge rectifier,
wherein the exciter is configured to energize the main field winding; and
a controller configured to control a polarity of the wound rotor section by transitioning the rotating bidirectional bridge rectifier between a magnetic flux enhancement mode and a magnetic flux weakening mode.

16. The system of claim 15, wherein the rotating bidirectional bridge rectifier comprises a plurality of bidirectional switches, wherein the plurality of bidirectional switches are controllable by the controller to transition between the magnetic flux enhancement mode and the magnetic flux weakening mode.

17. The system of claim 15, further comprising:
an exciter stator configured to control an output of the exciter, wherein the controller is configured to control a magnitude of the second portion of the rotating magnetic field generated by the wound rotor section by increasing or decreasing an exciter current provided to the exciter stator.

18. The system of claim 15, further comprising:
a zero volt fallback controller configured to control the second portion of the rotating magnetic field generated by the wound rotor section to a magnitude and direction that cancels the first portion of the rotating magnetic field generated by the plurality of permanent magnets.

19. The system of claim 15, wherein the exciter is configured to output a polyphase power source to the rotating bidirectional bridge rectifier, and the rotating bidirectional bridge rectifier is configured to rectify the polyphase power source to output a positive DC signal or a negative DC signal to the main field winding based on control of the rotating bidirectional bridge rectifier between the magnetic flux enhancement mode and the magnetic flux weakening mode.

* * * * *